(12) United States Patent
Xu et al.

(10) Patent No.: US 10,230,992 B2
(45) Date of Patent: Mar. 12, 2019

(54) STRONG INTRA SMOOTHING FOR IN REXT

(71) Applicant: SONY CORPORATION, Tokyo (JP)

(72) Inventors: Jun Xu, Sunnyvale, CA (US); Ali Tabatabai, Cupertino, CA (US); Ohji Nakagami, Tokyo (JP); Teruhiko Suzuki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 99 days.

(21) Appl. No.: 14/635,176

(22) Filed: Mar. 2, 2015

(65) Prior Publication Data

US 2015/0249843 A1 Sep. 3, 2015

Related U.S. Application Data

(60) Provisional application No. 61/947,207, filed on Mar. 3, 2014, provisional application No. 61/954,248, filed on Mar. 17, 2014, provisional application No. 61/971,140, filed on Mar. 27, 2014.

(51) Int. Cl.
| | |
|---|---|
| *H04N 19/86* | (2014.01) |
| *H04N 19/157* | (2014.01) |
| *H04N 19/186* | (2014.01) |
| *H04N 19/117* | (2014.01) |
| *H04N 19/179* | (2014.01) |

(52) U.S. Cl.
CPC ........... *H04N 19/86* (2014.11); *H04N 19/117* (2014.11); *H04N 19/157* (2014.11); *H04N 19/186* (2014.11); *H04N 19/179* (2014.11)

(58) Field of Classification Search
None
See application file for complete search history.

(56) References Cited

U.S. PATENT DOCUMENTS

| | | | |
|---|---|---|---|
| 4,704,605 A | 11/1987 | Edelson | |
| 8,576,924 B2 | 11/2013 | Kwan et al. | |
| 9,615,086 B2 * | 4/2017 | Jeon | H04N 19/182 |
| 2006/0114986 A1 | 6/2006 | Knapp, II et al. | |
| 2008/0181304 A1 | 7/2008 | Sekiguchi et al. | |
| 2012/0189058 A1* | 7/2012 | Chen | H04N 19/159 375/240.15 |
| 2013/0003832 A1* | 1/2013 | Li | H04N 19/105 375/240.12 |
| 2013/0188744 A1 | 7/2013 | Van der Auwera et al. | |

(Continued)

FOREIGN PATENT DOCUMENTS

| | | |
|---|---|---|
| WO | 2013/160656 A2 | 10/2013 |
| WO | 2013160770 A1 | 10/2013 |
| WO | 2014/007718 | 1/2014 |

OTHER PUBLICATIONS

Selur, Selur's Little Messageboard. Dec. 26, 2013. [retrieved on Apr. 28, 2015]. Retrieved from the Internet: <URL:http://forum.selur.de/topic2218-h265x265.html?. entire document.

(Continued)

*Primary Examiner* — Mohammad J Rahman
(74) *Attorney, Agent, or Firm* — Chip Law Group

(57) ABSTRACT

Based on conditions or restrictions, Strong Intra Smoothing (SIS) is enabled or disabled. SIS is not allowed for chroma when the chroma format is 444, and SIS is not allowed for chroma when the chroma format is 422 or 444.

2 Claims, 2 Drawing Sheets

(56) References Cited

U.S. PATENT DOCUMENTS

| | | | |
|---|---|---|---|
| 2014/0036998 A1 | 2/2014 | Narroschke et al. | |
| 2014/0185665 A1* | 7/2014 | Pu ................... | H04N 19/00066 375/240.02 |
| 2014/0219336 A1* | 8/2014 | Jeon ................. | H04N 19/00303 375/240.02 |
| 2015/0063460 A1* | 3/2015 | Gamei ................ | H04N 19/122 375/240.18 |
| 2015/0334424 A1* | 11/2015 | Maeda ................ | H04N 19/103 375/240.02 |

OTHER PUBLICATIONS

David Flynn et al., "High Efficiency Video Coding (HEVC) Range Extensions Test Specification: Draft 6", Joint Collaborative team on Video Coding (JCT-VC) of ITU-T SG 16 WP 3 and ISO/IEC JCT 1/SC 29/WG 11, 16th Meeting: San Jose, US, Jan. 9-17, 2014; D.
Extended European Search Report of EP Application No. 15758557.1, dated Sep. 14, 2017, 11 pages of EESR.
Silcock, et al., "Extension of HM7 to Support Additional Chroma Formats", Joint Collaborative Team on Video Coding (JCT-VC) of ITU-T SG 16 WP 3 and ISO/IEC JTC I/SC 29/WG 11, 10th Meeting: Stockholm, SE, Jul. 11-20, 2012, 16 pages.
Rosewarne, et al., "HEVC Range Extensions Test Model 6 Encoder Description", Joint Collaborative Team on Video Coding (JCT-VC) of ITU-T SG16 WP3 and ISO/IEC JTC1/SC29/WG11, 16th Meeting: San Jose, US, Jan. 9-17, 2014, 20 pages.
Sharman, et al., "AHG7: Options Present in Extended Chroma Format Model", Joint Collaborative Team on Video Coding (JCT-VC) of ITU-T SG 16 WP 3 and ISO/IEC JTC 1/SC 29/WG 11, 11th Meeting: Shanghai, CN, Oct. 10-19, 2012, 16 pages.
Xu, et al., "Fix for Strong Intra Smoothing in RExt", Joint Collaborative Team on Video Coding (JCT-VC) of ITU-T SG 16 WP 3 and ISO/IEC JTC 1/SC 29/WG 11, 17th Meeting: Valencia, ES, Mar. 27-Apr. 4, 2014, 3 pages.
Kim, et al., "AhG5: Deblocking Filter in 4:4:4 Chroma Format", Joint Collaborative Team on Video Coding (JCT-VC) of ITU-T SG 16 WP 3 and ISO/IEC JTC 1/SC 29/WG 11 14th Meeting: Vienna, AT, Jul. 25-Aug. 2, 2013, 4 pages.
Dong, et al., "SEI Message: Post Filters to Enhance the Chroma Planes", Joint Collaborative Team on Video Coding (JCT-VC) of ITU-T SG 16 WP 3 and ISO/IEC JTC 1/SC 29/WG 11, 14th Meeting: Vienna, AT, Jul. 25-Aug. 2, 2013, 9 pages.
Anonymous, "h265/x265 (p. 1)—Problems & Questions—Selur's Little Messageboard", Retrieved from the Internet: URL:http://forum.selur.de/topic218-h265x265.html, Jul. 23, 2013, pp. 1-11.
Silcock, et al., "Extension of HM7 to Support Additional Chroma Formats", Joint Collaborative Team on Video Coding (JCT-VC) of ITU-T SG 16 WP3 and ISO/IEC JTC1/SC 29/WG 11, JCTVC-J0191, 10th Meeting, Stockholm, SE, Jul. 11-20, 2012, 16 pages.
Tan, et al., "Contouring Artefact and Solution", Joint Collaborative Team on Video Coding (JCT-VC) of ITU-T SG 16 WP3 and ISO/IEC JTC1/SC 29/WG 11, JCTVC-K0139, 11th Meeting, Shanghai, CN, Oct. 10-19, 2012, 08 pages.
Kim, et al., "AhG5: Deblocking Filter in 4:4:4 Chroma Format", Joint Collaborative Team on Video Coding (JCT-VC) of ITU-T SG 16 WP3 and ISO/IEC JTC1/SC 29/WG 11, JCTVC-N0263, 4th Meeting, Vienna, AT, Jul. 25-Aug. 2, 2013, 04 pages.
Kang, et al., "Non-RCE3: Implicit Derivation for Adaptively Turning Filtering off in Intra Prediction", Joint Collaborative Team on Video Coding (JCT-VC) of ITU-T SG 16 WP3 and ISO/IEC JTC1/SC 29/WG 11, JCTVC-O0181_r2, 15th Meeting, Geneva, CR, Oct. 23-Nov. 1, 2013, 08 pages.
Xu, et al., "Fix for Strong Intra Smoothing in RExt", Joint Collaborative Team on Video Coding (JCT-VC) of ITU-T SG 16 WP3 and ISO/IEC JTC1/SC 29/WG 11, JCTVC-Q0128_r1, 17th Meeting, Valencia, ES, Mar. 27-Apr. 4, 2014, 05 pages.
Anonymous, "h265/x265 (p. 1)—Problems & Questions—Selur's Little Messageboard", URL:http://forum.selur.de/topic218-h265x265.html, Jul. 23, 2013, 11 pages.
Extended European Search Report of EP Application No. 17209631.5, dated Apr. 11, 2018, 11 pages of EESR.
Min, et al., "AHG5: Reference Sample Filtering in Intra Prediction for Extended Color Format", Joint Collaborative Team on Video Coding (JCT-VC) of ITU-T SG16 WP3 and ISO/IEC JTC1/SC29/WG11, Document: JCTVC-M0106, 13th Meeting, Incheon, KR, Apr. 18-26, 2013, 07 pages.
Wang, et al., "Spec Text Changes for JCTVC-L0045 based on JCTVC-L0030", Joint Collaborative Team on Video Coding (JCT-VC) of ITU-T SG 16 WP 3 and ISO/IEC JTC 1/SC 29/WG 11, Document: JCTVC-L0045, 12th Meeting, Geneva, CH, Jan. 14-23, 2013, 05 pages.
Xu, et al., "Fix for Strong Intra Smoothing in RExt", Joint Collaborative Team on Video Coding (JCT-VC) of ITU-T SG 16 WP 3 and ISO/IEC JTC 1/SC 29/WG 11, Document: JCTVC-Q0128, 17th Meeting, Valencia, ES, Mar. 27, 2004 Apr. 2014, 04 pages.
Office Action for JP Patent Application No. 2016-546100, dated Nov. 6, 2018, 09 pages of Office Action and 04 pages Of English Translation.

* cited by examiner

STRONG INTRA SMOOTHING FOR IN REXT

CROSS-REFERENCE TO RELATED APPLICATION(S)

This application claims priority under 35 U.S.C. § 119(e) of the U.S. Provisional Patent Application Ser. No. 61/947,207, filed Mar. 3, 2014 and titled, "Strong Intra Smoothing for in RExt," U.S. Provisional Patent Application Ser. No. 61/954,248, filed Mar. 17, 2014 and titled, "Strong Intra Smoothing for in RExt," and U.S. Provisional Patent Application Ser. No. 61/971,140, filed Mar. 27, 2014 and titled, "Strong Intra Smoothing for in RExt," which are hereby incorporated by reference in their entireties for all purposes.

FIELD OF THE INVENTION

The present invention relates to video coding. More specifically, the present invention relates to high efficiency video coding.

BACKGROUND OF THE INVENTION

In JCTVC-P1005_v1, Strong Intra Smoothing (SIS) is allowed to apply to chroma when chroma format is 4:4:4. When intra_smoothing_disabled_flag is equal to 0 and either cIdx is equal to 0 or ChromaArrayType is equal to 3, the filtering process of neighboring samples specified is invoked with the sample array p and the transform block size nTbS as inputs, and the output is reassigned to the sample array p. In RExt6.0 SIS is only allowed for luma. Thus, there is a mismatch on how to deal with SIS for the chroma in 444 chroma format.

SUMMARY OF THE INVENTION

Based on conditions or restrictions, Strong Intra Smoothing (SIS) is enabled or disabled. SIS is not allowed for chroma when the chroma format is 444, and SIS is not allowed for chroma when the chroma format is 422 or 444.

In one aspect, a method programmed in a non-transitory memory of a device comprises acquiring video content and encoding the video content without implementing strong intra smoothing depending on the chroma format of the video content. The method further comprises determining the chroma format is 444; and not enabling strong intra smoothing. The method further comprises determining the chroma format is 422 or 444; and not enabling strong intra smoothing. A strong intra smoothing flag is equal to 1 and a image component index is equal to 0. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a television, a home entertainment system and smart jewelry.

In another aspect, a system programmed in a non-transitory memory of a device comprises a receiving device configured for receiving encoded video content, wherein the encoded video content was encoded without using strong intra smoothing depending on the chroma format of the video content and a display device configured for displaying the encoded video content. Encoding the encoded video content included determining the chroma format is 444; and not enabling strong intra smoothing. Encoding the encoded video content included determining the chroma format is 422 or 444 and not enabling strong intra smoothing. A strong intra smoothing flag is equal to 1 and a image component index is equal to 0. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a television, a home entertainment system and smart jewelry.

In another aspect, an apparatus comprises a display device, a non-transitory memory for storing an application, the application for receiving video content, wherein the video content was encoded without using strong intra smoothing depending on the chroma format of the video content and displaying the video content on the display device and a processing component coupled to the memory, the processing component configured for processing the application. Encoding the encoded video content included determining the chroma format is 444; and not enabling strong intra smoothing. Encoding the encoded video content included determining the chroma format is 422 or 444; and not enabling strong intra smoothing. A strong intra smoothing flag is equal to 1 and a image component index is equal to 0. The apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a television, a home entertainment system and smart jewelry.

DETAILED DESCRIPTION OF THE PREFERRED EMBODIMENT

Figure 1:
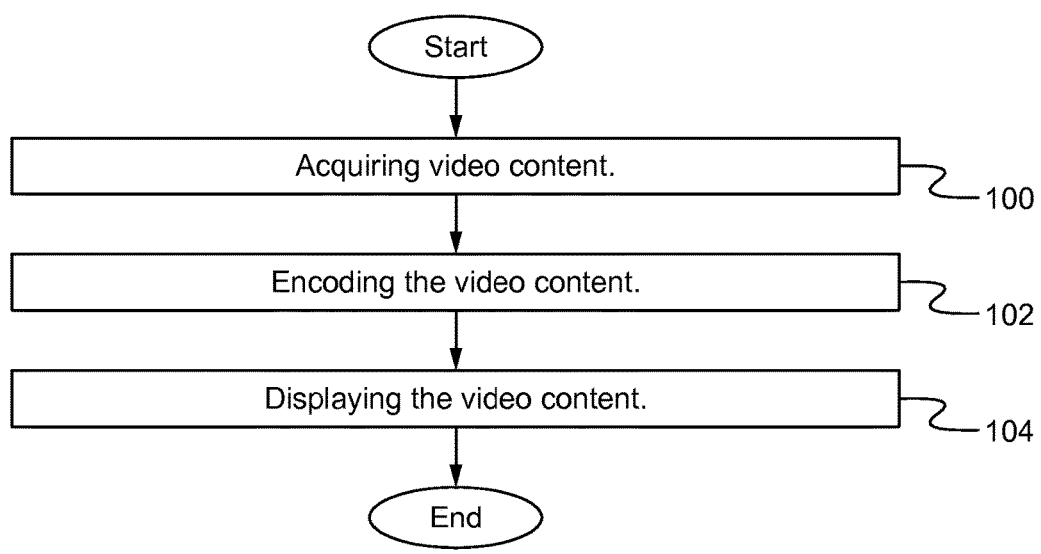
FIG. 1 illustrates a flowchart of an SIS decision method according to some embodiments.

In High Efficiency Video Coding (HEVC) version 1, strong intra smoothing (SIS) is applied to luma (420 format) to reduce (e.g. smooth) some visual artifacts in intra prediction. In Range Extension (RExt) of HEVC, more chroma formats (monochrome, 4:2:2 and 4:4:4) and higher bitdepths (12, 14, 16) are supported. Implementations to extend the SIS in RExt to address SIS for 444 chroma format. Restrictions on applying SIS are also described.

SIS introduces blocking artifacts and coding efficiency loss although SIS improves contouring artifacts. If the disabling SIS conditions are not satisfied, then the appropriate flag is set to a value other than 0 such as 1.

Filtering Process of Neighboring Samples
...

When filterFlag is equal to 1, the following applies:
 The variable biIntFlag is derived as follows:
  If all of the following conditions are true, biIntFlag is set equal to 1:

strong_intra_smoothing_enabled_flag is equal to 1
nTbS is equal to 32
cldx is equal to 0 //cldx is the image component index
Abs(p[−1][−1]+p[nTbS*2−1][−1]−2*p[nTbS−1][−1]< (1<<(BitDepth$_Y$−5))
Abs(p[−1][−1]+p[−1][nTbS*2−1]−2*p[−1][nTbS−1])<(1<<(BitDepth$_Y$−5))

Otherwise, biIntFlag is set equal to 0.

Shown herein is a comparison between SIS "on" and "off" for chroma, based on both AHG5 and AHG8 test sequences. The reference software used is HM13.0+RExt6.0.

More specifically, SIS "on" means that SIS is allowed for chroma when the chroma format is 4:4:4 and SIS is applied because intra_smoothing_disabled_flag is set to 0 (false) in default settings. Anchor: SIS "off" is exactly the HM13.0+ RExt6.0.

In the simulation, AHG5 test sequences and conditions apply. Because the simulation is run in a cluster, encoding and decoding times are not accurate. The results are summarized in Table 1. Results show that allowing SIS for chroma when chroma format is 4:4:4 will degrade the coding performance of current reference software under common test conditions.

TABLE 1

Summary of results for AHG5 conditions

|  | All Intra Main-tier | | | All Intra High-tier | | | All Intra Super High-tier | | |
| --- | --- | --- | --- | --- | --- | --- | --- | --- | --- |
|  | Y | U | V | Y | U | V | Y | U | V |
| RGB: 4:4:4 | 0.0% | 0.0% | 0.0% | 0.0% | 0.0% | 0.0% | 0.0% | 0.0% | 0.0% |
| YCbCr 4:4:4 | 0.4% | 0.4% | 0.4% | 0.2% | 0.2% | 0.2% | 0.1% | 0.1% | 0.0% |
| YCbCr 4:2:2 | 0.0% | 0.0% | 0.0% | 0.0% | 0.0% | 0.0% | 0.0% | 0.0% | 0.0% |
| Enc Time[%] | 99% | | | 100% | | | 100% | | |
| Dec Time[%] | 101% | | | 101% | | | 99% | | |

|  | Random Access Main-tier | | | Random Access High-tier | | |
| --- | --- | --- | --- | --- | --- | --- |
|  | Y | U | V | Y | U | V |
| RGB: 4:4:4 | 0.0% | 0.0% | 0.0% | 0.0% | 0.0% | 0.0% |
| YCbCr 4:4:4 | 0.2% | 0.3% | 0.1% | 0.1% | 0.1% | 0.0% |
| YCbCr 4:2:2 | 0.0% | 0.0% | 0.0% | 0.0% | 0.0% | 0.0% |
| Enc Time[%] | 100% | | | 101% | | |
| Dec Time[%] | 99% | | | 101% | | |

|  | Low delay B Main-tier | | | Low Delay B High-tier | | |
| --- | --- | --- | --- | --- | --- | --- |
|  | Y | U | V | Y | U | V |
| RGB: 4:4:4 | 0.0% | 0.0% | 0.0% | 0.0% | 0.0% | 0.0% |
| YCbCr 4:4:4 | 0.1% | 0.4% | 0.1% | 0.1% | 0.1% | 0.0% |
| YCbCr 4:2:2 | 0.0% | 0.0% | 0.0% | 0.0% | 0.0% | 0.0% |
| Enc Time[%] | 103% | | | 101% | | |
| Dec Time[%] | 100% | | | 99% | | |

In the simulation, AHG8 test sequences and conditions apply. Because the simulation is run in a cluster, encoding and decoding times are not accurate. The results are summarized in Table 2. Results show that allowing SIS for chroma when the chroma format is 4:4:4 will degrade the coding performance of current reference software under common test conditions.

TABLE 2

Summary of results for AHG8 conditions

|  | All Intra Main-tier | | | All Intra High-tier | | | All Intra Super High-tier | | |
| --- | --- | --- | --- | --- | --- | --- | --- | --- | --- |
|  | Y | U | V | Y | U | V | Y | U | V |
| Class F | 0.0% | 0.0% | 0.0% | 0.0% | 0.0% | 0.0% | 0.0% | 0.0% | 0.0% |
| Class B | 0.0% | 0.0% | 0.0% | 0.0% | 0.0% | 0.0% | 0.0% | 0.0% | 0.0% |
| RGB: 4:4:4 SC | 0.0% | 0.0% | 0.0% | 0.0% | 0.0% | 0.0% | 0.0% | 0.0% | 0.0% |
| RGB: 4:4:4 Ani | 0.0% | 0.0% | 0.0% | 0.0% | 0.0% | 0.0% | 0.0% | 0.0% | 0.0% |
| YCbCr 4:4:4 SC | 0.0% | 0.0% | 0.0% | 0.0% | 0.0% | 0.0% | 0.0% | 0.0% | 0.0% |
| YCbCr 4:4:4 Ani | 0.2% | 0.2% | 0.2% | 0.1% | 0.1% | 0.1% | 0.1% | 0.0% | 0.0% |
| RangExt | 0.2% | 0.2% | 0.1% | 0.1% | 0.1% | 0.0% | 0.0% | 0.0% | 0.0% |
| RGB4:4:4SC(op) | 0.0% | 0.0% | 0.0% | 0.0% | 0.0% | 0.0% | 0.0% | 0.0% | 0.0% |
| YCbCr 4:4:4 SC (optional) | 0.0% | 0.0% | 0.0% | 0.0% | 0.0% | 0.0% | 0.0% | 0.0% | 0.0% |
| Enc Time[%] | | | | | | | | | |
| Dec Time[%] | | | | | | | | | |

TABLE 2-continued

Summary of results for AHG8 conditions

| | Random Access Main-tier | | | Random Access High-tier | | |
|---|---|---|---|---|---|---|
| | Y | U | V | Y | U | V |
| Class F | 0.0% | 0.0% | 0.0% | 0.0% | 0.0% | 0.0% |
| Class B | 0.0% | 0.0% | 0.0% | 0.0% | 0.0% | 0.0% |
| RGB: 4:4:4 SC | 0.0% | 0.1% | 0.0% | 0.1% | 0.1% | 0.1% |
| RGB: 4:4:4 Anim | 0.0% | 0.0% | 0.0% | 0.0% | 0.0% | 0.0% |
| YCbCr 4:4:4 SC | 0.1% | 0.1% | 0.1% | 0.1% | 0.1% | 0.0% |
| YCbCr 4:4:4 Anim | 0.1% | 0.0% | 0.0% | 0.1% | 0.0% | 0.0% |
| RangExt | 0.1% | 0.0% | 0.0% | 0.0% | 0.0% | 0.0% |
| RGB4:4:4 SC (optional) | 0.1% | 0.1% | 0.2% | 0.0% | 0.0% | 0.0% |
| YCbCr 4:4:4 SC (optional) | 0.0% | 0.0% | 0.0% | 0.0% | −0.1% | 0.0% |
| Enc Time[%] | | | | | | |
| Dec Time[%] | | | | | | |

| | Low delay B Main-tier | | | Low Delay B High-tier | | |
|---|---|---|---|---|---|---|
| | Y | U | V | Y | U | V |
| Class F | 0.0% | 0.0% | 0.0% | 0.0% | 0.0% | 0.0% |
| Class B | 0.0% | 0.0% | 0.0% | 0.0% | 0.0% | 0.0% |
| RGB: 4:4:4 SC | 0.1% | 0.0% | 0.1% | 0.1% | 0.0% | 0.1% |
| RGB: 4:4:4 Anim | −0.1% | −0.1% | 0.0% | −0.1% | 0.0% | 0.0% |
| YCbCr 4:4:4 SC | −0.1% | 0.0% | −0.1% | −0.1% | 0.0% | −0.2% |
| YCbCr 4:4:4 Anim | 0.0% | 0.0% | 0.1% | 0.0% | 0.0% | 0.1% |
| RangExt | 0.0% | 0.1% | 0.0% | 0.0% | 0.0% | 0.0% |
| RGB4:4:4 SC (optional) | −0.7% | −0.8% | −0.7% | −0.2% | −0.3% | −0.3% |
| YCbCr 4:4:4 SC (optional) | −0.6% | −0.7% | −0.5% | −0.7% | −0.8% | −0.7% |
| Enc Time[%] | | | | | | |
| Dec Time[%] | | | | | | |

FIG. 1 illustrates a flowchart of an SIS decision method according to some embodiments. In the step 100, video content is acquired, transmitted and/or received. In the step 102, the video content is encoded. The video content is encoded using SIS with the conditions/restrictions described herein. For example, SIS is not allowed (e.g., disabled) for chroma when the chroma format is 444. In another example, SIS is not allowed for chroma when the chroma format is 422 or 444. In the step 104, the video content is displayed. In some embodiments, fewer or additional steps are implemented. For example, the encoded video content is decoded after it is encoded. In some embodiments, the order of the steps is modified. For example, the video content is encoded and then transmitted.

Figure 2:
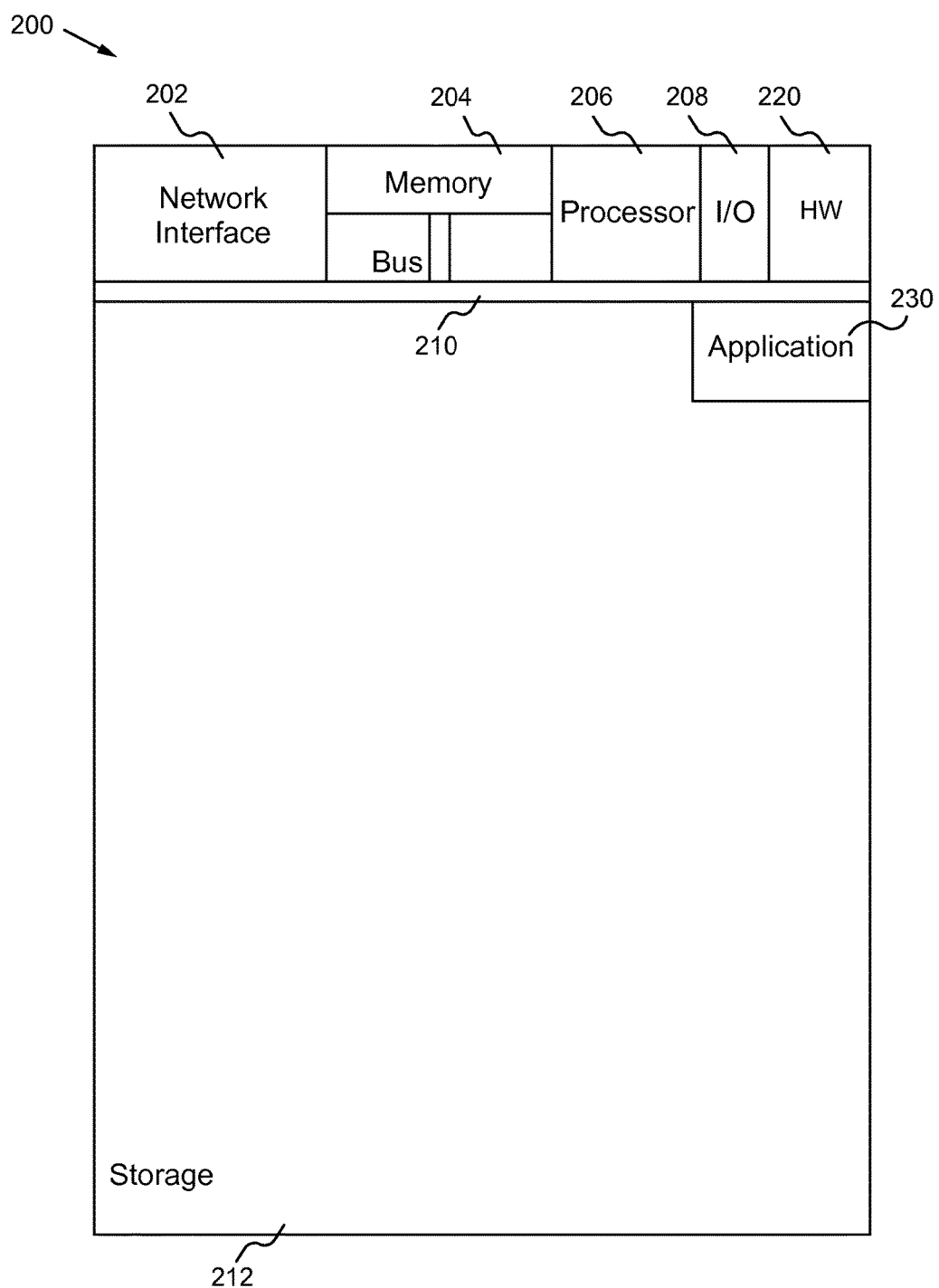
FIG. 2 illustrates a block diagram of an exemplary computing device configured to implement the SIS decision method according to some embodiments.

FIG. 2 illustrates a block diagram of an exemplary computing device configured to implement the SIS decision method according to some embodiments. The computing device 200 is able to be used to acquire, store, compute, process, communicate and/or display information such as images and videos. In general, a hardware structure suitable for implementing the computing device 200 includes a network interface 202, a memory 204, a processor 206, I/O device(s) 208, a bus 210 and a storage device 212. The choice of processor is not critical as long as a suitable processor with sufficient speed is chosen. The memory 204 is able to be any conventional computer memory known in the art. The storage device 212 is able to include a hard drive, CDROM, CDRW, DVD, DVDRW, High Definition disc/drive, ultra-HD drive, flash memory card or any other storage device. The computing device 200 is able to include one or more network interfaces 202. An example of a network interface includes a network card connected to an Ethernet or other type of LAN. The I/O device(s) 208 are able to include one or more of the following: keyboard, mouse, monitor, screen, printer, modem, touchscreen, button interface and other devices. SIS decision method application(s) 230 used to implement the SIS decision method are likely to be stored in the storage device 212 and memory 204 and processed as applications are typically processed. More or fewer components shown in FIG. 2 are able to be included in the computing device 200. In some embodiments, SIS decision method hardware 220 is included. Although the computing device 200 in FIG. 2 includes applications 230 and hardware 220 for the SIS decision method, the SIS decision method is able to be implemented on a computing device in hardware, firmware, software or any combination thereof. For example, in some embodiments, the SIS decision method applications 230 are programmed in a memory and executed using a processor. In another example, in some embodiments, the SIS decision method hardware 220 is programmed hardware logic including gates specifically designed to implement the SIS decision method.

In some embodiments, the SIS decision method application(s) 230 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, smart jewelry (e.g., smart watch) or any other suitable computing device.

To utilize the SIS decision method described herein, a device such as a digital camera/camcorder is used to acquire image/video content or a device such as a television is used to display video content. The SIS decision method is automatically used during the encoding process of the acquired or displayed video content such as when the video content is transmitted. The SIS decision method is able to be implemented with user assistance or automatically without user involvement.

In operation, the SIS decision method determines when SIS is implemented to ensure proper and efficient encoding of content.

Some Embodiments of Strong Intra Smoothing for In Rext

1. A method programmed in a non-transitory memory of a device comprising:
   a. acquiring video content; and
   b. encoding the video content without implementing strong intra smoothing depending on the chroma format of the video content.
2. The method of clause 1 further comprising determining the chroma format is 444; and not enabling strong intra smoothing.
3. The method of clause 1 further comprising determining the chroma format is 422 or 444; and not enabling strong intra smoothing.
4. The method of clause 1 wherein a strong intra smoothing flag is equal to 1 and a image component index is equal to 0.
5. The method of clause 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a television, a home entertainment system and smart jewelry.
6. A system programmed in a non-transitory memory of a device comprising:
   a. a receiving device configured for receiving encoded video content, wherein the encoded video content was encoded without using strong intra smoothing depending on the chroma format of the video content; and
   b. a display device configured for displaying the encoded video content.
7. The system of clause 6 wherein encoding the encoded video content included determining the chroma format is 444; and not enabling strong intra smoothing.
8. The system of clause 6 wherein encoding the encoded video content included determining the chroma format is 422 or 444; and not enabling strong intra smoothing.
9. The system of clause 6 wherein a strong intra smoothing flag is equal to 1 and a image component index is equal to 0.
10. The system of clause 6 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a television, a home entertainment system and smart jewelry.
11. An apparatus comprising:
    a. a display device;
    b. a non-transitory memory for storing an application, the application for:
       i. receiving video content, wherein the video content was encoded without using strong intra smoothing depending on the chroma format of the video content; and
       ii. displaying the video content on the display device; and
    c. a processing component coupled to the memory, the processing component configured for processing the application.
12. The apparatus of clause 11 wherein encoding the encoded video content included determining the chroma format is 444; and not enabling strong intra smoothing.
13. The apparatus of clause 11 encoding the encoded video content included determining the chroma format is 422 or 444; and not enabling strong intra smoothing.
14. The apparatus of clause 11 wherein a strong intra smoothing flag is equal to 1 and a image component index is equal to 0.
15. The apparatus of clause 11 wherein the apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a television, a home entertainment system and smart jewelry.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:
1. An image processing device, comprising:
   a processor configured to:
      enable a strong intra smoothing operation for a plurality of neighboring samples, neighbor with a 32×32 block, based on a value of an image component index,
         wherein the value of the image component index indicates that chroma format of an image excludes one of chroma format 422 or chroma format 444;
      apply the strong intra smoothing operation to only a plurality of luma neighboring samples of the plurality of neighboring samples;
      generate a prediction image based on an intra prediction on a plurality of luma samples within the 32×32 block,
         wherein the intra prediction on the plurality of luma samples within the 32×32 block is based on the plurality of luma neighboring samples; and
      encode the image based on the prediction image.

2. An image processing method, comprising:
- enabling a strong intra smoothing operation for a plurality of neighboring samples, neighboring with a 32×32 block, based on a value of an image component index, wherein the value of the image component index indicates that chroma format of an image excludes one of chroma format 422 or chroma format 444;
- applying the strong intra smoothing operation to only a plurality of luma neighboring samples of the plurality of neighboring samples;
- generating a prediction image based on an intra prediction on a plurality of luma samples within the 32×32 block, wherein the intra prediction on the plurality of luma samples within the 32×32 block is based on the plurality of luma neighboring samples; and
- encoding the image based on the prediction image.

* * * * *